US006583917B2

(12) United States Patent
Melloni et al.

(10) Patent No.: US 6,583,917 B2
(45) Date of Patent: Jun. 24, 2003

(54) OPTICAL INTENSITY MODULATION DEVICE AND METHOD

(75) Inventors: Andrea Melloni, Milan (IT); Mario Martinelli, San Donato Milanese (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 10/022,255

(22) Filed: Dec. 20, 2001

(65) Prior Publication Data

US 2002/0191266 A1 Dec. 19, 2002

Related U.S. Application Data

(60) Provisional application No. 60/260,208, filed on Jan. 9, 2001.

(30) Foreign Application Priority Data

Dec. 22, 2000 (EP) .............................. 00311680

(51) Int. Cl.[7] .......................... G02F 1/03; G02F 1/035
(52) U.S. Cl. ...................... 359/245; 359/254; 385/3; 385/1; 385/2; 385/8; 385/31; 385/39
(58) Field of Search ........................ 359/238, 254, 359/322, 278, 245; 385/1, 2, 3, 4, 8, 9, 14, 15, 16, 24, 27, 31, 39, 40, 41, 130, 131, 132

(56) References Cited

U.S. PATENT DOCUMENTS

| | | | |
|---|---|---|---|
| 5,109,441 A | | 4/1992 | Glaab |
| 6,204,951 B1 | * | 3/2001 | Coward et al. ............. 359/245 |
| 6,393,166 B1 | * | 5/2002 | Burns ........................... 385/2 |

FOREIGN PATENT DOCUMENTS

WO   WO 98/53367   11/1998

OTHER PUBLICATIONS

Hallemeier et al.; "Next Generation 10Gb/s Lithium Niobate Modulator Components For RZ Based Transmission Techniques"; NFOEF Technical Proc., pp. 157–180, (1999).

Wooten et al.; "A Review Of Lithium Niobate Modulators for Fiber–Optic Communications Systems"; IEEE Journal of Selected Topics in Quantum Electronics, vol. 6, No. 1, pp. 69–82, (2000).

Veselka et al.; "Pulse Generation For Soliton Systems Using Lithium Niobate Modulators"; IEEE Journal Selected Topics in Quantum Electronics, vol. 2, No. 2, pp. 300–310, (1996).

Weihs et al.; "All–Fiber Three–Path Mach–Zehnder Interferometer"; Optics Letters, vol. 21, No. 4, pp. 302–304, (1996).

Haus et al.; "Three–Waveguide Couplers For Improved Sampling and Filtering"; IEEE Journal of Quantum Electronics, vol. QE–17, No. 12, pp. 2321–2325, (1981).

* cited by examiner

*Primary Examiner*—Georgia Epps
*Assistant Examiner*—Tuyen Tra
(74) *Attorney, Agent, or Firm*—Finnegan, Henderson, Farabow, Garrett & Dunner, L.L.P.

(57) ABSTRACT

An optical intensity modulator for high-speed RZ and NRZ data modulation based on a balanced three-arm Mach-Zehnder interferometer. The three arms are joined at the input and output sides of the device by three-way couplers. The input coupler is structured to couple approximately equal powers into the first and third arms and no more than 50% power into the second arm. In the straight sections of the arms, there is arranged an AC electrode structure for applying an RF modulation signal and a DC electrode structure for biasing the device at a working point. The AC electrode structure is arranged so that an applied modulation signal induces a negative phase shift ($-\Delta\phi$) in the first arm in relation to the second arm and a positive phase shift ($+\Delta\phi$) in the third arm in relation to the second arm.

20 Claims, 11 Drawing Sheets

OPTICAL INTENSITY MODULATION DEVICE AND METHOD

CROSS REFERENCE TO RELATED APPLICATIONS

This application claims the benefit of U.S. Provisional Application No. 60/260,208, filed Jan. 9, 2001, the content of which is incorporated herein by reference, and claims the right to priority based on European Application No. 00311680.3, filed Dec. 22, 2000.

BACKGROUND OF THE INVENTION

The invention relates to optical intensity modulators, more especially, but not exclusively, to optical modulators suitable for high bit rate optical communication systems using return-to-zero (RZ) data modulation.

The Mach-Zehnder interferometer (MZI) is perhaps the most common solution for realizing integrated optical intensity modulators. An optical signal is split from an input waveguide by a Y-splitter (or 2-way coupler) into two waveguide arms. Electrodes are placed along the two arms to control the optical path length difference between the two arms, e.g. using the electro-optic effect. The two arms rejoin at another Y-splitter (or 2-way coupler) so that light components carried by the two arms interferometrically recombine. Data carried by an electrical signal connected to the electrodes can be used to control the interferometric recombination of the light components at the output Y-splitter, thereby impressing the data onto an optical signal traversing the device. A favored technology for implementing MZI's is a lithium niobate crystal substrate with diffused titanium waveguides (LiNbO$_3$:Ti technology). A variety of other technologies can also be used, for example GaAs.

FIG. 1 of the accompanying drawings illustrates a conventional balanced MZI 110 comprising two arms 118 and 120. The device is fabricated in an x-cut lithium niobate substrate 100, as described in reference [1] and reference [2]. In use, a phase shift is induced between the two arms 118 and 120, trough the electro-optic effect. The phase shift is induced by applying an RF data modulation signal across a signal electrode 114 and two ground electrodes 112 and 116, suitably arranged in respect of the arms 118 and 120. As well as AC (i.e. RF) electrodes, there are also provided DC electrodes (not shown) for biasing the modulator at a desired working point. A desired intensity variation at the interferometer output is thus obtained to provide data modulation. In the figure, there is also shown an output side phase modulator 125 suitable for chirping the signal output from the MZI 110 using a pair of electrodes 130 and 132. In this way, chirped RZ (CRZ) data modulation can be achieved.

The MZI modulator is easy to realize, is simple to use and achieves high performance. It has thus become a key component in optical communication systems. However, the relatively weak electro-optical coefficient of the available materials used for realization of the waveguides means that the modulator electrodes need to be relatively long in order to induce the necessary phase shift to the light. Long electrodes are undesirable, because they limit the frequency bandwidth of the modulator.

With the continuously increasing bit rate of modem optical communication systems and the interest in RZ data modulation for soliton and other non-linear transmission systems, there is a need for an intensity modulator capable of generating still shorter optical pulses.

In principle, to provide shorter optical pulses, it is sufficient to feed the AC electrodes of a simple MZI with shorter RF pulses. However, in this case, the bandwidth of the modulator (i.e. the bandwidth of the RF drivers and the RF electrodes of the modulator) must be at least equal to the bandwidth of the RF pulses or even higher, that is higher than the inverse of the bit rate. This approach is generally avoided because of the large bandwidth required by the modulator.

FIG. 2 of the accompanying drawings shows an approach designed to solve this problem, as disclosed in references [1], [2] and [3]. The proposed approach is to cascade two MZI's 10 and 150. The illustrated device is fabricated in x-cut lithium niobate. In use, one of the MZI's, for example MZI 110, is modulated via its electrodes 112, 114 and 116 with non-return-to-zero (RZ) modulated data, while the other MZI 150 is modulated via its electrodes 152, 154, 156 with a clock signal for converting the NRZ optical signal into an RZ optical signal. Generally, the clock-signal receiving MZI has travelling wave electrodes resonating at the clock frequency, which equals the bit rate of the NRZ modulated data If a chirp is also desired, another phase modulator must be cascaded to the two NZI's. In other words an additional stage similar to the phase modulator shown in FIG. 1 would be added to the device of FIG. 2. As a result, the device would become even longer than the two-stage device of FIG. 2. In addition, it would be difficult to synchronize the two, or even three, modulating RF signals applied to the electrodes.

SUMMARY OF THE INVENTION

The invention is based on the idea of dispensing with the conventional two-arm MZI (2aMZI) used in the prior art for RZ data modulation and instead using a suitably biased and configured three-arm MZI (3aMZI).

More especially, according to one aspect of the invention, there is provided a device for modulating an optical signal comprising:

an interferometer comprising: an optical signal divider; first, second and third arms; and an optical signal combiner arranged respectively to divide, convey and interferometrically recombine components of the optical signal into, along and from the arms, wherein the optical signal divider is structured so that the components of the optical signal coupled into the first and third arms are of approximately equal power;

a DC electrode structure for biasing the interferometer at a working point of the device; and an AC (i.e. RF) electrode structure for applying an electrical modulation signal to the interferometer, wherein the AC electrode structure is configured so that the electrical modulation signal induces phase shifts of opposite sign and approximately equal magnitude in the first and third aims.

Although it is preferred that the three-arm interferometer is of the Mach-Zehnder type, in principal other interferometer configurations could be used, such as Michelson. However, in the following, it is assumed that the three-am interferometer is a 3aMZI. In addition, it may be possible to add further arms to the interferometer.

The 3aMZI modulator can be used as a data modulator or a pulse generator, for example.

In preferred embodiments, the 3aMZI has a symmetric power split between the first and third arms, with no more than 50% of the total power coupled into the second arm, and an antisymmetric phase shift between the first and third arms.

The second arm may be arranged as a central waveguide between the first and third arms which are arranged as two external waveguides extending either side of the central waveguide. Typically, the three waveguides will be joined at the input side of the device by some form of input signal divider and at the output side by some form of output signal combiner. The signal divider and combiner can be fabricated using splitters or couplers. Various alternative implementations are discussed further below.

As mathematically described further below, the 3aMZI may provide the same form of intensity (or power) transfer function as two cascaded 2aMZI's (2×2aMZI—see FIG. 2), but has a number of advantages over the 2×2aMZI modulator of reference [1], and more generally over 2aMZI modulator designs.

One advantage is that with a 3aMZI modulator, only one modulation source is required, that is only one RF driver is required. By contrast, each stage of the 2×2aMZI modulator requires a separate RF driver. This is of benefit for achieving high data rates, since there is no requirement to synchronize different RF drivers (e.g. one for the clock and another for NRZ data).

Another related advantage is that a 3aMZI modulator is inherently more compact than the 2×2aMZI modulator, since it has only one stage rather than two. This is also of benefit for achieving high data rates.

A further advantage is that, in comparison with a 2aMZI modulator, the 3aMZI modulator can provide a larger notch width, which makes the device generally more robust, for example to noise in the input optical signal or modulating electronic signal. Notch width is the width of the zero of the intensity transfer function, as measured in terms of voltage or phase. The notch width is sensitive to the coupling constants of the input and output couplers or splitters. Choice of the coupling constants can thus be used to provide a desired notch width. In the example of a 3aMZI modulator in which 50% of the power is coupled into the central waveguide and 25% of the power is coupled into each of the two external waveguides, the notch width of the 3aMZI is about one order of magnitude larger than that of a 2aMZI modulator. A larger notch width makes the device less sensitive to variations in the technological fabrication processes. Further, a larger notch width means that the device is more tolerant to variations in the DC bias and RF drive signals. For digital applications, the 3aMZI architecture is thus inherently more robust than 2aMZI architectures.

A still further advantage is that the 3aMZI modulator can be embodied to provide efficient RZ modulation or NRZ modulation. Moreover, if desired, a single 3aMZI modulator can be designed to be switchable between multiple operational modes, for example one operational mode for RZ modulation and another for NRZ modulation. Specific examples of how this can be achieved are given in the detailed description below. Moreover, if desired, he RZ modulation can be chirped to provide chirped return-zero (CRZ) modulation. This can be achieved by adding a conventional phase modulation stage (see FIG. 1).

It is believed it a 3aMZI architecture has not previously been proposed for RZ or NRZ data modulation. However, it is noted that a 3aMZI was proposed in reference [5] in the context of analogue amplitude modulation of a CATV (cable television) signal containing a large range of frequency components requiring a linear modulation. Reference [6] discloses a four-arm MZI, also for amplitude modulation in CATV networks.

Reference [4] discloses a 3aMZI. The device is all-fiber and the phase modulations in the three arms are induced by piezoceramics. This device is intended for applications in the field of interferometric measurements and quantum physics, rather than for any data modulation applications for optical telecommunications.

There are some other properties of the 3aMZI structure which are now also discussed.

Like notch width, notch voltage, i.e. the voltage at which the notch occurs in the intensity transfer function, is dependent on the coupling constants of the input and output couplers or splitters. Generally, as the proportion of power coupled into the central waveguide is increased, both the notch voltage and notch width will increase.

In some preferred embodiments, it is beneficial to provide a notch width (related to the zero range of the device transfer function) that is as wide as possible. Maximum notch width is calculated to occur at 50% power coupled into the second arm, with significantly enhanced values of notch width (compared to a 2aMZI) occurring when 30% or more power is coupled into the second arm. Accordingly, it is preferred that between 30 and 50%, more preferably 40 and 50%, still more preferably 45 to 50%, of the total power is coupled into the second arm.

In another preferred embodiments of the invention there is provided a 25:50:25 power split between the first, second and third arms respectively. This power split provides very good extinction ratio performance. Allowing for variations around this preferred power split, the signal divider may thus be structured to couple between 40% to 60%, more preferably 42 to 58%, still more preferably 45 to 55%, yet more preferably 46.5 to 53.5% of the total power into the second arm (e.g. central waveguide.

Moreover, the difference in the respective power fractions coupled into the first and Gird arms should be less than about 8%, more preferably 5%, for most applications. The signal divider may thus be structured so that the components of the optical signal coupled into the first and third arms are of approximately equal power. Fabrication of a 3aMZI modulator can be based on existing processes used for 2aMZI modulators. The microwave circuits used for the RF drivers can also be based on those used for conventional 2aMZI modulators. For example, co-planar microwave waveguides can be used as the electrodes and can be of the same dimensions in a 3aMZI modulator as for a 2aMZI modulator.

The 3aMZI generally has a higher drive voltage $V_{90}$ than a 2aMZI. That is, a 3aMZI requires a higher applied voltage to produce a sufficient phase difference in the intensity transfer function to change the output state from high to low or vice versa. The drive voltage in a 3aMZI is up to twice that of a 2aMZI, with the precise factor depending on the input power split into the arms of the 3aMZI. With 50% power coupled into the central waveguide and 25% power coupled into each of the two external waveguides, the factor is 2.

The transfer function of a 3aMZI with an antisymmetric phase shift and symmetric power splitting ratio is non-sinusoidal. Consequently, the practical interest in such 3aMZI devices is probably restricted to data modulation, i.e. digital applications. By contrast for amplitude modulation applications, such as CATV distribution, a linear response is required for good quality amplification References [5] and [6] disclose thee and four arm MZI designs for amplitude modulation applications.

The device may be fabricated in a substrate or epitaxial layer of lithium niobate, lithium tantalate or related crystal compound. The lithium niobate or related compound may be X-cut or Z-cut. The waveguides may be fabricated using conventional Ti diffusion processes. The electrodes may be fabricated using conventional Au sputtering processes. Alternatively, the device may be implemented in GaAs or other III–V compounds. The material choice is not critical to the device so any other waveguide technology may be considered, for example silica waveguide technology.

The AC electrode structure may comprise a signal electrode arranged adjacent to the second arm and ground electrodes arranged adjacent to the first and third arms. Alternatively, the AC electrode structure may comprise ground electrodes arranged adjacent to the second arm and a signal electrode arranged adjacent to the first and third arms. Further, the signal electrode may be split into two separate, individually drivable electrodes which allows RF drivers with lower peak powers to be used. The cost is that the two RF drivers need to be synchronized. The AC electrode structure is preferably symmetrical with respect to the interferometer arms. The AC electrodes are preferably travelling wave electrodes, since these can provide higher speed with existing technology. Lumped electrodes could however be used. The DC bias electrodes will typically be lumped. It will also be understood that the electrode positioning in relation to the waveguide arms will depend on the nature of the substrate, e.g. x-cut or z-cut.

A variety of conventional components can be used for the input signal divider, i.e. for splitting light from the input waveguide into the waveguide arms of the 3aMZI. Similarly, a variety of conventional components may be used for the output signal combiner, i.e. for recombining the light from the waveguide arms into the output waveguide. Three-way couplers may be used. Alternatively a cascade of two two-way couplers could be used. Moreover, instead of three-way couplers, tree-way splitters can be used. These are sometimes called tri-furcations or three-furcations in analogy with the term bi-furcation sometimes used to describe Y-splitters. Similarly, two two-way splitters (i.e. two Y-splitters) could be cascaded.

Among these alternatives, the preferred component for the output signal combiner is a three-way coupler, since this provides two monitor lines of the modulator output at no extra cost. One or both of these can be used for providing feedback for stabilizing the biasing of the 3aMZI. Feedback stabilization can be achieved by controlling the DC supply used for biasing the DC electrodes responsive to the monitor feedback signal from the output coupler.

To implement this functionality, the device may further comprise a bias controller having an output connected to the bias power supply and an input connected to the signal combiner, the controller being operable to control the biasing of the DC electrode structure, and us the working point of the device, responsive to a feedback signal received at its input from the signal combiner.

When the signal combiner is a three-way coupler, as preferred, its central output waveguide is preferably used to carry the modulated optical signal and one or both of its two peripheral waveguides are used to provide the feedback signal to the bias controller.

By comparison, in a 2×2aMZI modulator, operational stability is less easy and convenient to implement, since two feedback control loops are needed for full stabilization, one for each stage. Another relevant point is that if the 3aMZI modulator uses couplers (rather than splitters) for the signal division and combination their coupling lengths are not critical and may even be different. By contrast in a 2aMZI, it is critical that the coupling lengths are carefully controlled and equal. This is because the transfer function of a 3aMZI is relatively insensitive to the coupler properties.

According to a second aspect of the invention there is provided a method of modulating an optical signal comprising:

(a) providing an interferometer having first, second and third arms;

(b) biasing the interferometer at a working point thereof;

(c) supplying an optical signal to the interferometer;

(d) dividing the optical signal into components in each of the first, second and third arms, wherein the components of the optical signal coupled into the first and third arms are of approximately equal power; and (e) applying a modulation signal to the interferometer so as to induce phase shifts of opposite sign and approximately equal magnitude in the first and third arms.

In one mode of operation, the working point is approximately at a maximum in the power transfer function of the interferometer, to provide return-zero (RZ) modulation of the optical signal.

In another mode of operation, the working point is approximately at a minimum in the power transfer function of the interferometer, to provide return-zero (RZ) modulation of the optical signal.

In a further mode of operation, the working point is intermediately positioned between a minimum and a maximum of the power transfer function of the interferometer, to provide non-return-zero (NRZ) modulation of the optical signal. In this case, the working point is preferably approximately midway between the maximum and minimum of the power transfer function.

A device according to the first aspect of the invention may be configured to provide only one of these modes of operation. However, the device could be configured to be switchable between any two of the above modes, or all three of the above modes, to provide a multi-mode device. In this way, a device could provide multiple RZ modulation modes, for example one with small notch width and one wit large notch width. Another example would be a device switchable between RZ and NRZ data modulation modes.

BRIEF DESCRIPTION OF THE DRAWINGS

For a better understanding of the invention and to show how the same may be carried into effect reference is now made by way of example to the accompanying drawings in which.

Figure 10:
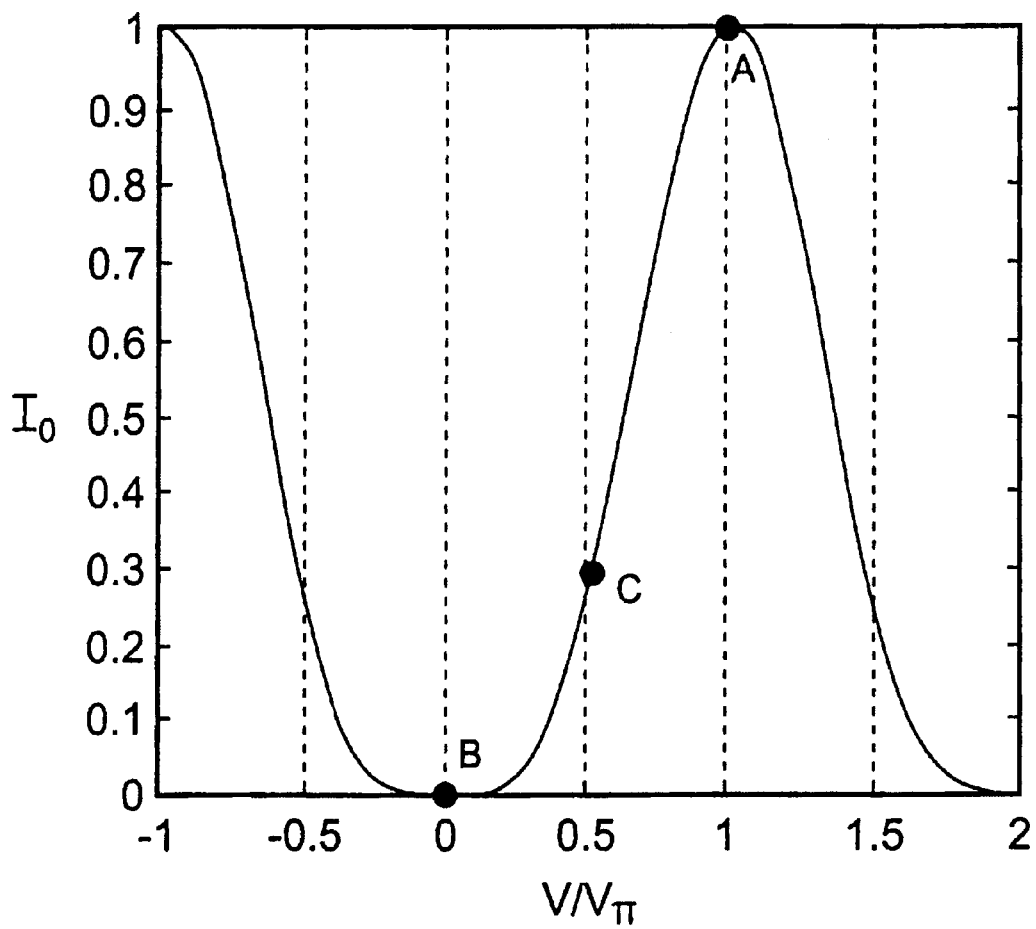
FIG. 10 is a graph of the intensity transfer function of the modulator of the first embodiment plotted against DC bias voltage V as a fraction of the drive voltage $V_\pi$.
Figure 11A:
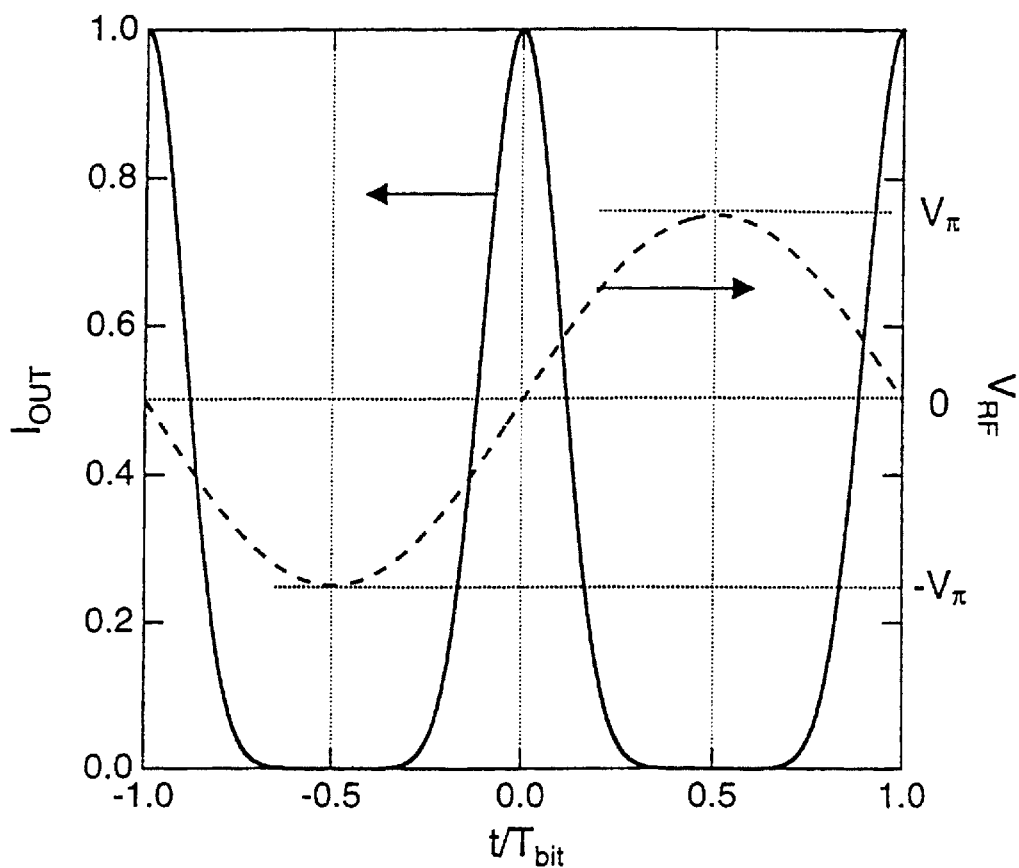
FIG. 11A is a graph plotting output intensity $I_{OUT}$ of the optical modulator of the first embodiment (solid line: left hand axis) as a function of time t normalize to inverse bit rate $T_{bit}$ when the device is held at Operating Point A of FIG. 10 and driven with a sinusoidal RF signal $V_{RF}$ (dashed line.
Figure 11B:
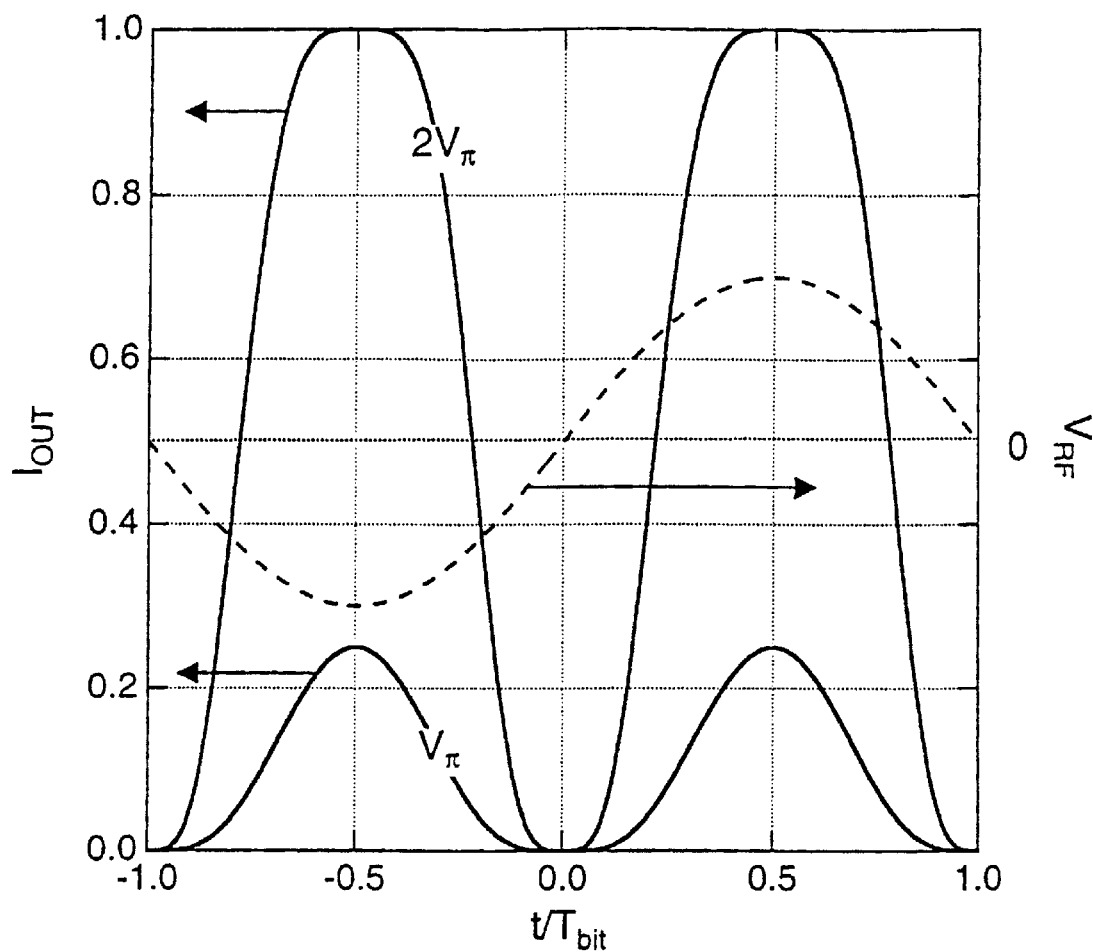
Figure 11C:
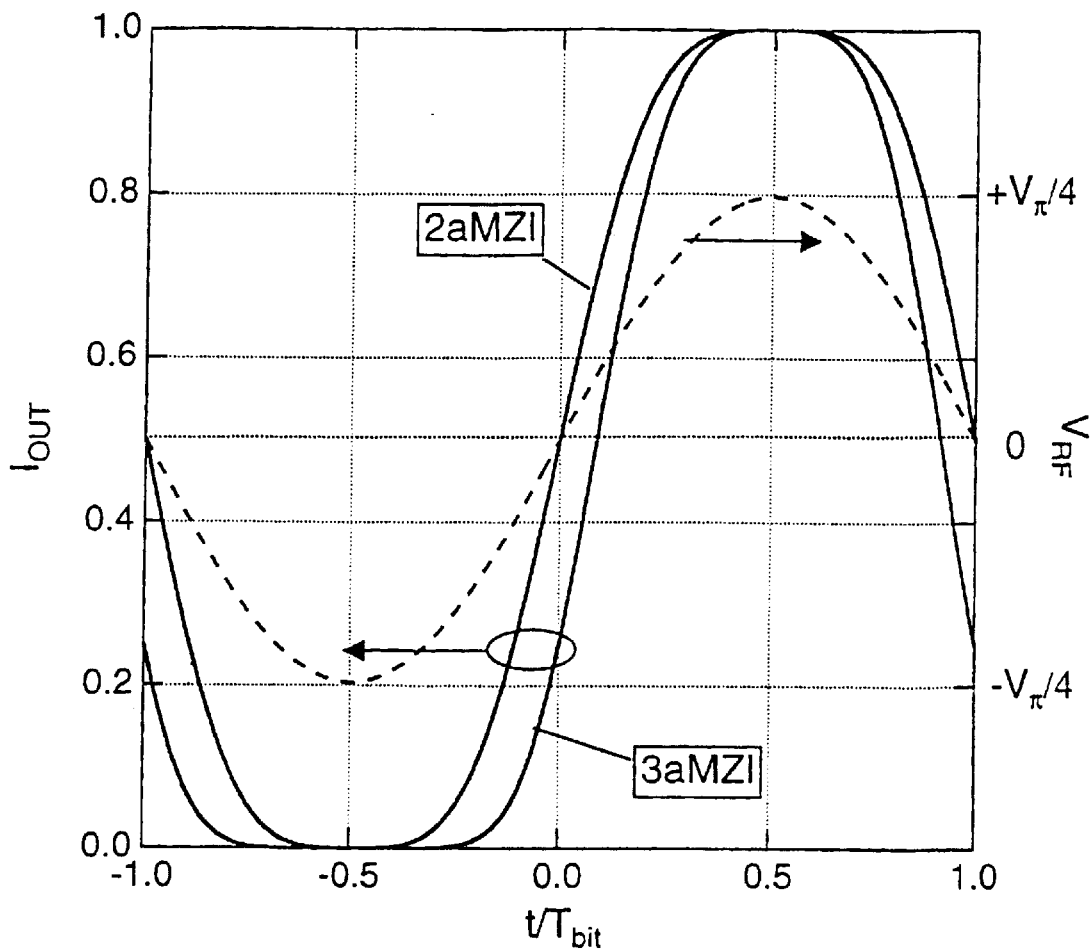
Figure 12:
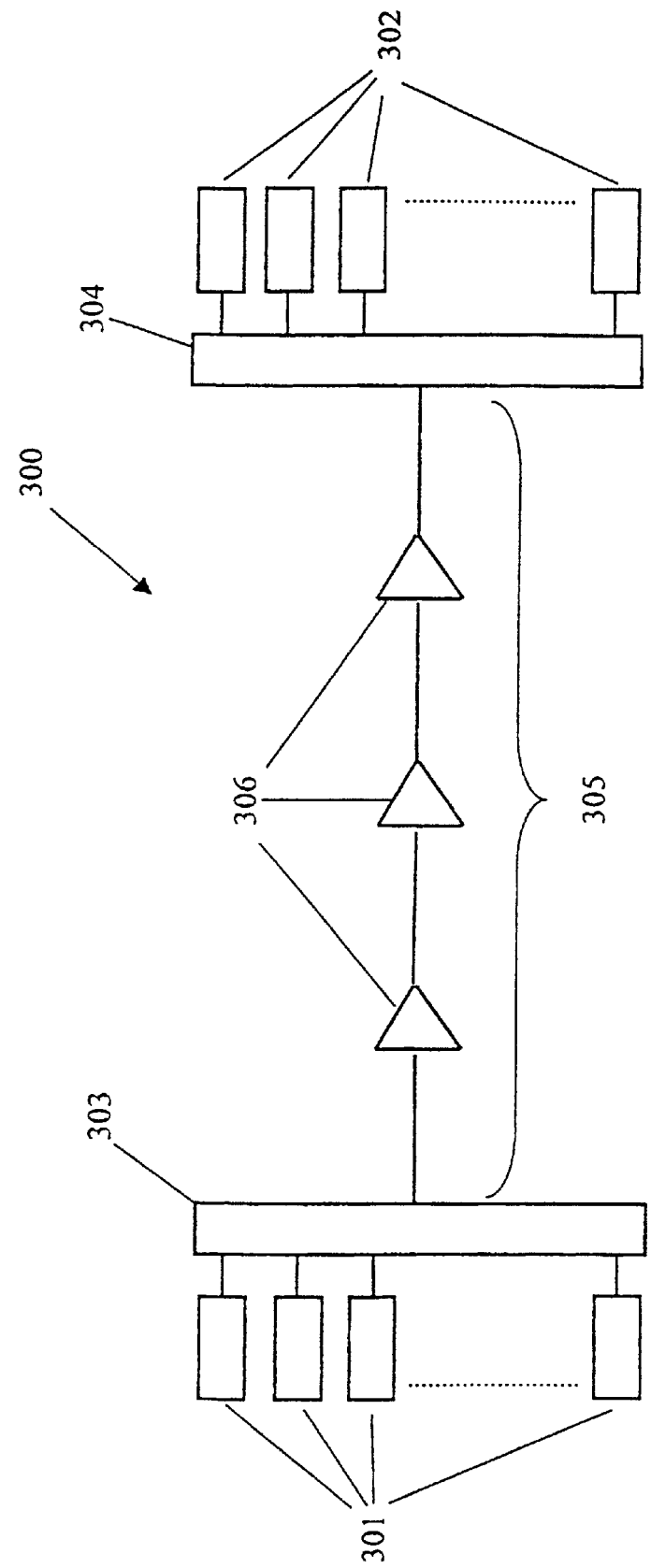
Figure 13:
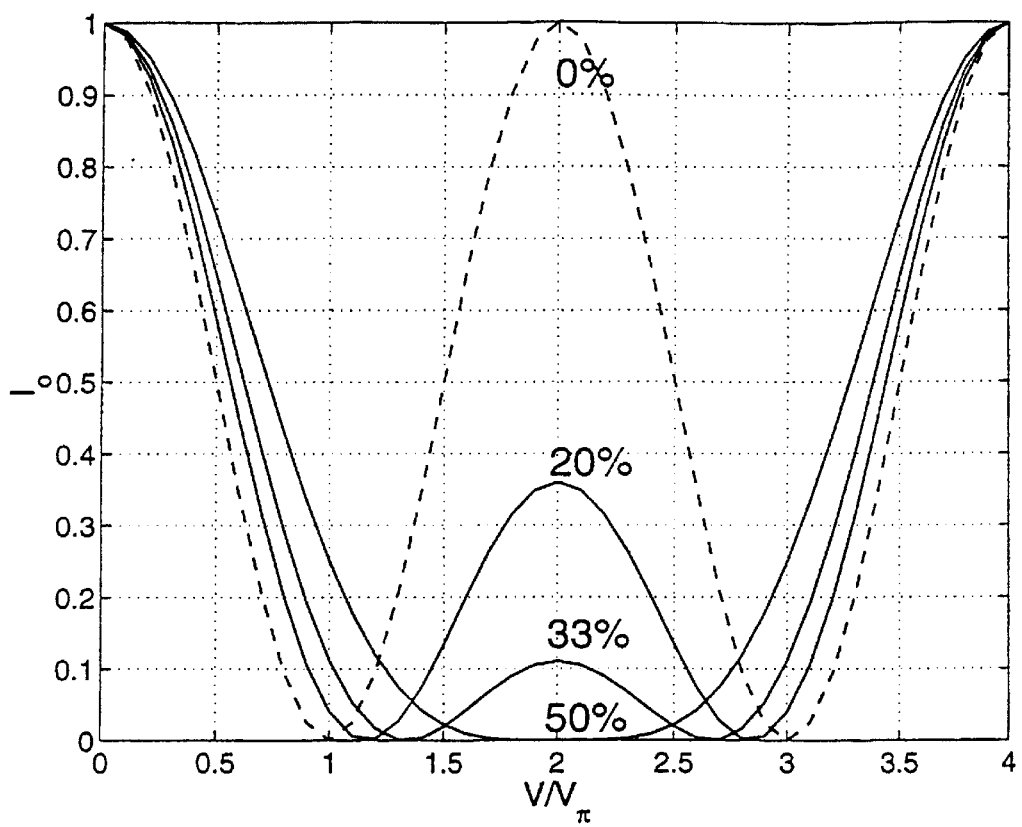
Figure 14:
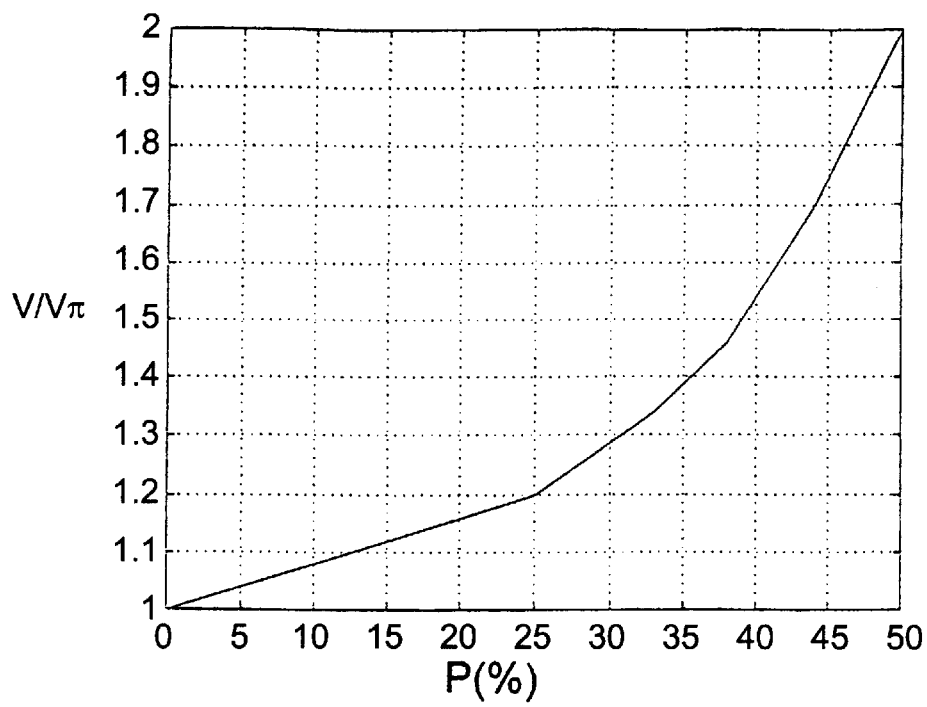
Figure 15:
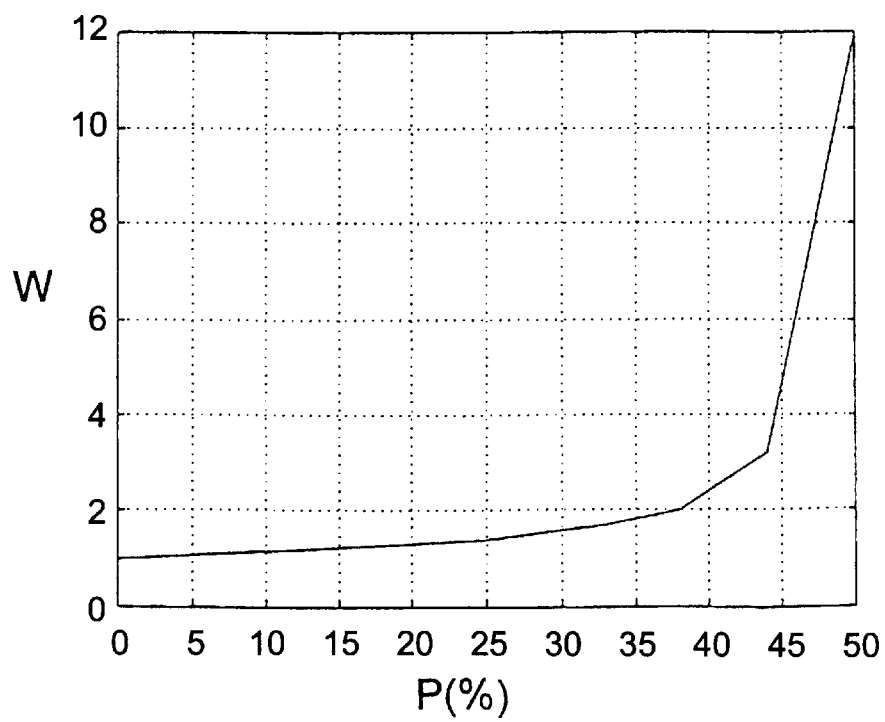
Figure 16A:
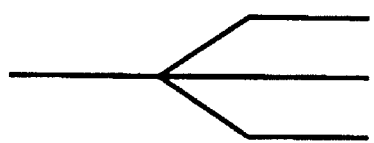
Figure 16B:
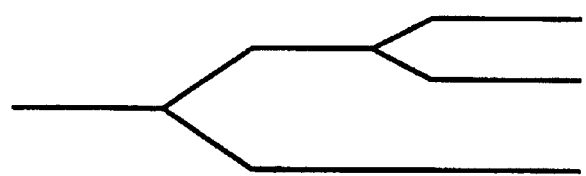
Figure 16C:
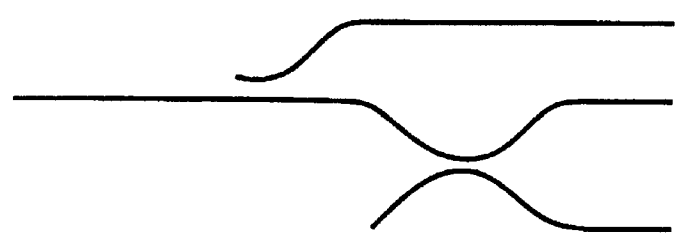
Figure 17:
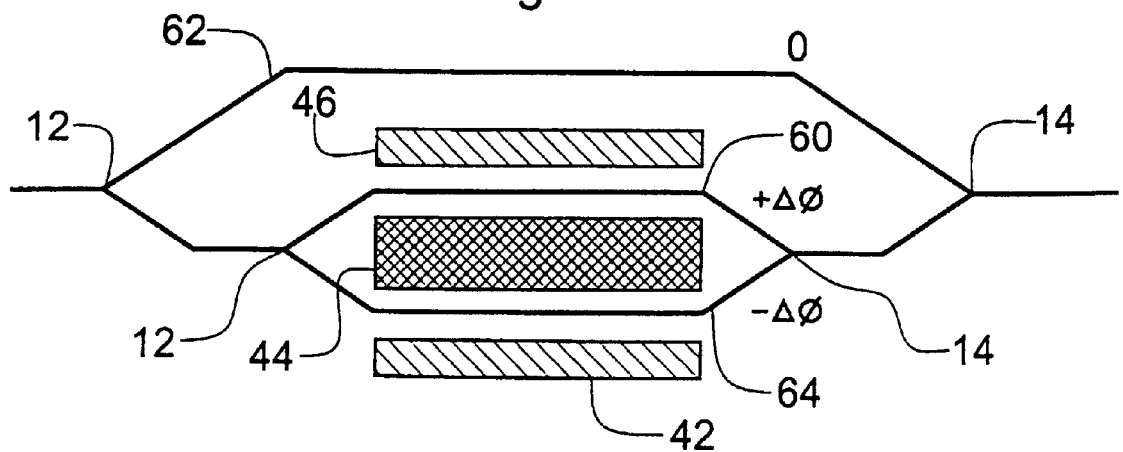

right hand axis) of peak-to-peak amplitude of twice the drive voltage, i.e. $2V_\pi$, in a RZ transmission mode;

FIG. 11B is a graph plotting output intensity $I_{OUT}$ of the optical modulator of the first embodiment (solid lines: left hand axis) as a function of time t normalized to inverse bit rate $T_{bit}$ when the device is held at Operating Point B of FIG. 10 and driven with a sinusoidal RF signal $V_{RF}$ (dashed line: right hand axis) of peak-to-peak amplitude of twice ($2V_\pi$) or once ($V_\pi$) the drive voltage in a RZ transmission mode;

FIG. 11C is a graph plotting output intensity $I_{OUT}$ of the optical modulator of the first embodiment (solid line 3aMZI: left hand axis) as a function of time t normalized to inverse bit rate $T_{bit}$ when the device is held at Operating Point C of FIG. 10 and driven with a sinusoidal RF signal $V_{RF}$ (dashed line: right hand axis) of peak-to-peak amplitude of half the drive voltage, i.e. $V_\pi/2_t$ in a NRZ transmission mode: for reference the response of a 2aMZI is also shown (solid line: left hand axis);

FIG. 12 is a block schematic diagram of an optical transmission system incorporating optical modulators according to embodiments of the invention;

FIG. 13 is a graph showing the intensity transfer function of a 3aMZI for different power splitting ratios at the input;

FIG. 14 is a graph of notch position V (normalized to the notch position $V_\pi$ of a 2aMZI) plotted against percentage power in the central waveguide of the 3aMZI, to illustrate the voltage dependence of the first zero in the 3aMZI transfer function as a function of input power splitting ratio;

FIG. 15 is a graph of notch width (normalized to a 2aMZI) plotted against percentage power in the central waveguide of the 3aMZI, to illustrate the increase in notch width as higher power ratios are coupled into the central waveguide;

FIGS. 16A, 16B and 16C show alternative forms of input signal divider and output signal combiner; and FIG. 17 shows an optical modulator according to a further embodiment of the invention.

DETAILED DESCRIPTION

Figure 3:
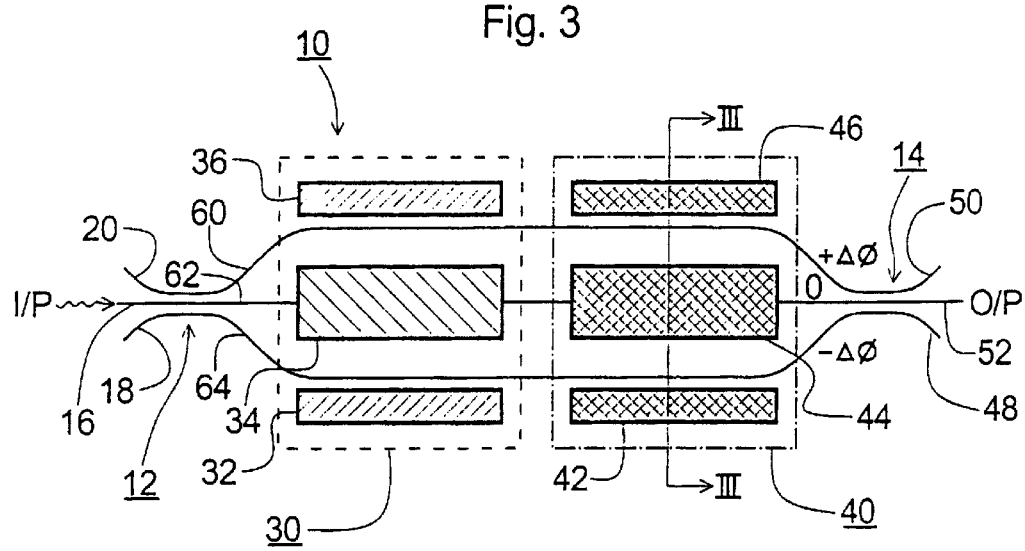
FIG. 3 shows an optical modulator according to a first embodiment of the invention based on a 3aMZI.
Figure 4:
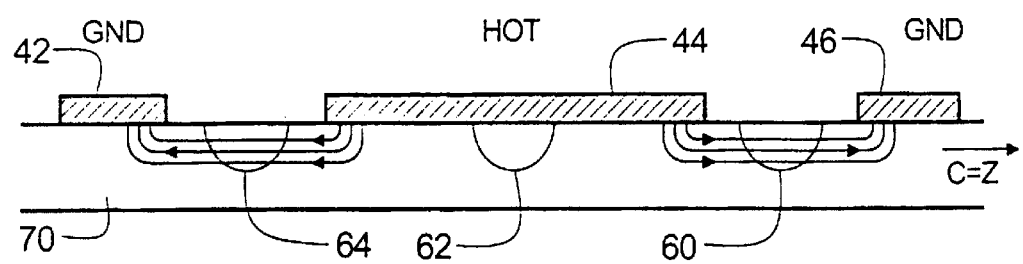
FIG. 4 is a section through line III—III of FIG. 3.
Figure 5:
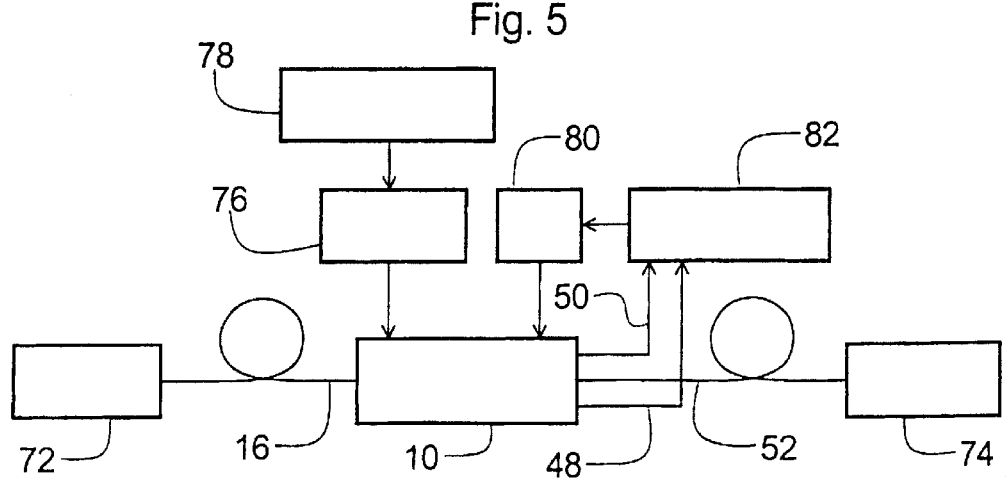
FIG. 5 is a block schematic diagram of the optical modulator of the first embodiment with associated drivers and other components.

FIGS. 3 to 5 show an optical intensity modulator device according to a first embodiment of the invention.

The optical intensity modulator 10 is based on a three-arm Mach-Zehnder interferometer (3aMZI) as shown schematically in plan view in FIG. 3. The modulator 10 comprises an input waveguide 16 which extends continuously to form a central waveguide 62 of the 3aMZI. Two external waveguides 60 and 64 extend from an input signal divider 12 in the form of a three-way coupler. The three-way coupler 12 is arranged to split the input optical power propagating along the input waveguide 16 into the three arms 60, 62 and 64 of the interferometer. The continuations 18 and 20 of the external of the waveguide 60 and 64 at the input side of the three-way coupler 12 are not used, i.e. are vestigial. The waveguides 60, 62 and 64 constituting the three arms of the interferometer fan out from the coupler 12 and then extend in straight lines parallel to each other, similar to a conventional two-arm Mach-Zehnder interferometer (2aMZI).

The straight sections of the waveguides 60, 62 and 64 have arranged adjacent thereto a DC electrode structure 30 as well as an AC electrode structure 40. In the figure, the DC electrode structure 30 is shown as preceding the AC electrode structure 40, but the opposite order could be used.

The DC electrode structure 30 comprises a central ground electrode 34 arranged over the central waveguide 62 as well as two peripheral electrodes 32 and 36 which are used to apply a DC bias voltage to the 3aMZI. The role of the DC biasing is to maintain the modulator at its working or operating point in use. Typically the DC biasing is used to compensate for fabrication tolerances which result in the optical path lengths in the interferometer arms not being precisely equal, for compensating for temperature fluctuation induced changes, and changes in optical path length that arise from aging of the device. The DC biasing may also be used to move the device to or between working points, that is to a desired point on the intensity transfer function of the device. The DC electrodes are typically lumped electrodes.

The AC electrode structure 40 comprises a central electrode 44 arranged over the central waveguide 62 and two peripheral electrodes 42 and 46 arranged adjacent to the external waveguides 60 and 64. In the present embodiment, the peripheral AC electrodes 42 and 46 function as ground electrodes and the central AC electrode 44 functions as a signal electrode, being connected to receive an AC modulation signal from an appropriate RF drive circuit.

The AC electrodes are arranged so that an applied modulation signal induces equal and opposite phase shifts $\pm\Delta\phi$ in the lateral waveguides 60 and 64 relative to the central waveguide 62 which has zero relative phase shift. These phase shifts are indicated schematically in the figure with appropriate symbols.

The AC electrodes are travelling wave electrodes but, in an alternative embodiment, could be lumped electrodes. It will be understood that the illustrated electrode structure is of the push-pull type.

As will be appreciated from the placement of the electrodes, the illustration of FIG. 3 is of an x-cut crystal substrate of lithium niobate or related compound.

It will also be understood that buffer layers, e.g. of silica, may be provided between the electrodes and substrate to improve performance. For example, buffer layers under the AC electrodes can be used to improve waveguiding, and buffer layers under the DC electrodes can be used to reduce absorption At the output side of the device, the three interferometer arms 60, 62 and 64 recombine at a signal combiner 14 that is implemented in this embodiment as a three-way coupler. The central waveguide 62 extends continuously through the three-way coupler 14 to become an output waveguide 52. The two external waveguides 60 and 64 extend through the three-way coupler 14 to become output monitor waveguides 48 and 50 which are used in the present embodiment to convey a feedback signal for controlling the DC bias of the DC electrode structure 30, as described in more detail below.

The power splitting ratio between the central waveguide 62 and the two external waveguides 60 and 64 can be widely varied. However, the 3aMZI should be at least approximately balanced. In other words, the amounts of power coupled into the two external waveguides 60 and 64 should be approximately equal. The power splitting ratio has an important influence on the modulator's performance, as is discussed in detail further below.

FIG. 4 is a section through the modulator of the first embodiment taken through Section III of FIG. 3. This section is taken through the AC electrode structure in a direction transverse to the propagation direction of light through the 3aMZI. The device is fabricated in a lithium niobate substrate 70 which is x-cut, with the lithium niobate z-axis extending in the plane of the substrate and perpendicular to the axis of extent of the straight sections of the waveguides 60, 62 and 64. The waveguides 60, 62 and 64 are created by diffusing titanium into the substrate 70. As is conventional, titanium is first deposited as a strip on the surface of the crystal substrate 70. The temperature of the substrate 70 is then raised so that the titanium diffuses into the substrate to form the channels that act as waveguides. In one specific example, the waveguides are approximately 6 microns wide and 3 microns deep. To maximize the electro-optic effect in the waveguides, the electrodes 42, 44 and 46 are arranged so that the electric field in the direction of the z-axis of the lithium niobate is maximized in the region of the two peripheral waveguides 60 and 64. This is achieved by displacing the peripheral electrodes 42 and 46 laterally to one side of their respective external waveguides 64 and 60. In the central waveguide 62, the phase shift should preferably be negligible. To achieve this, it is usual to make the central electrode 44 sufficiently large so that the electric field induced between the central and peripheral electrodes does not impinge on the central waveguide as illustrated in FIG. 4. It will be understood that the central electrode 44 is the "hot" signal electrode and the peripheral electrodes 42 and 46 are the ground electrodes, the electrodes collectively forming a so-called push-pull configuration and the waveguides being in a so-called co-planar arrangement.

FIG. 5 shows the optical modulator of the first embodiment in terms of a block schematic diagram. The 3aMZI 10 already described with reference to FIGS. 3 and 4 is illustrated connected to a light source 72 for supplying the optical signal for modulation to the 3aMZI 10 via the input waveguide 16. The light source may be a laser, for example a semi-conductor distributed feedback (DFB) or distributed Bragg reflector (DBR) laser operating in the second or third telecommunications windows at around 1.3 or 1.55 microns respectively. These wavelength values are only exemplary. The device will function at any desired wavelength where a suitable structure can be fabricated.

At the output side of 3aMZI 10, there is illustrated the output waveguide 52 which is shown leading to an optical fiber launcher 74 for transmitting the modulated signal to a subsequent optical fiber. The launcher 74 may be for launching into a long haul optical fiber for telecommunications transmission, or for launching into a short haul fiber for a local area network (LAN), for example. The launcher 74 may include conventional components such as an optical isolator, a phase modulator for suppression of stimulated Brillouin scattering (SBS), optical amplifiers, wavelength division multiplexing (WDM) devices for multiplexing, demultiplexing or filtering optical channels, dispersion compensators, and so forth.

At the output side of the 3aMZI 10 there is also illustrated the output monitor waveguides 48 and 50. The output monitor waveguides 48 and 50 are connected to an input of an feedback controller 82. The feedback controller is operable to control the biasing of the DC electrode structure via a DC supply 80. The DC biasing is controlled responsive to the feedback signals received from the two monitor waveguides 48 and 50. Although both monitor waveguides 48 and 50 are illustrated as connected to the feedback controller 82, feedback may be provided by only using one of these two monitor waveguides. It will also be understood that the monitor waveguides 48 and 50 may terminate at photodiodes or the like to convert the feedback signal into an electrical signal for the feedback controller 82. This optoelectronic conversion may take place either directly as part of the 3aMZI module or inside the feedback controller module, or at an intermediate position therebetween. As already mentioned, the role of the feedback controller is to ensure that the voltages applied to the DC electrode structure maintain the 3aMZI 10 at a desired working point, e.g. for RZ or NRZ data modulation.

It is noted that by using a three-way coupler for that output signal combiner 14 two optical signals are provided to the monitor waveguides 48 and 50 at no extra cost. In other words, no additional couplers are needed to split off a feedback component of the output signal.

The device of the first embodiment further comprises an RF drive circuit 76, typically comprising an RF amplifier. The RF drive circuit 76 is connected to the AC electrode structure for impressing modulation data onto the optical signal being conveyed through the 3aMZI 10. The modulation data is supplied to the RF amplifier 76 via a data input 78.

Figure 1:
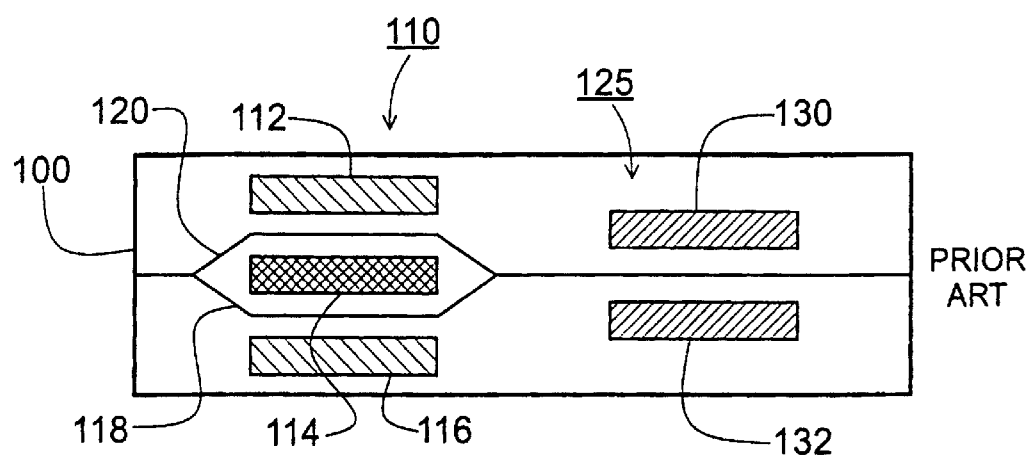
FIG. 1 shows a prior art optical modulator based on a 2aMZI with an additional output stage phase modulator for chirping.
Figure 2:
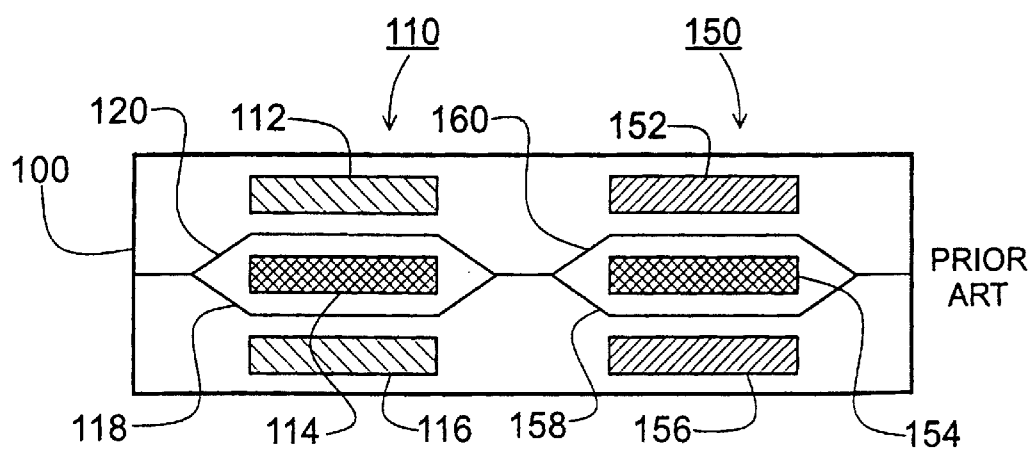
FIG. 2 shows a prior art optical modulator based on two cascaded 2aMZI's.

The operation of the device of the first embodiment is now described in more detail taking the example of a power splitting ratio at the input signal divider 12 which couples 50% of the power of the input signal into the central waveguide 62 and 25% of the power of the input signal into each of the two external waveguides 60 and 64. The DC bias serves to provide balancing of the three arms of the interferometer so that when an RF signal is applied a total phase shift of $\pm\Delta\phi$ is induced in the two external waveguides 60 and 64 relative to the central waveguide 62, as indicated schematically by the labelling on the output side of the 3aMZI in FIG. 3. In this case, for the specific example of a 25:50:25 power splitting ratio between the three arms 60, 62 and 64 respectively, the transfer function of the 3aMZI is given, in terms of intensity, via the following formula;

$$I_o = \left| \frac{1}{2} + \frac{1}{4}e^{-j\Delta\phi} + \frac{1}{4}e^{+j\Delta\phi} \right|^2 = \frac{1}{4}(1+\cos\Delta\phi)^2 \quad (1)$$

where $I_0$ is the output intensity of the central waveguide 62. (A more complicated expression general to any power splitting ratio may also be derived). Interestingly, this transfer fraction for the 3aMZI is the same as that of the 2×2aMZI of the prior art illustrated in FIG. 2. More specifically, in the case that equal and opposite phase shifts of $\pm\Delta\phi$ are provided in the two arms of both MZI's in the prior art device of FIG. 2, then its intensity transfer function is:

$$I_o = \cos(\Delta\phi)^2 = \frac{1}{4}(1+\cos 2\Delta\phi)^2 \quad (2)$$

As is evident, the transfer functions of equations (1) and (2) have the same form, the only difference being that the period of the intensity transfer function in Equation (1) is twice that of the corresponding period in Equation (2). In practice, this means that the DC (and RF) drive voltage $V_\pi$ of the 3aMZI modulator is twice that of the comparable DC drive voltage of the 2×2aMZI modulator. The same effect on the signal is thus obtained with either a 3aMZI or 2×2aMZI by supplying the same total RF power. Another significant practical point is that only one RF driver is needed for the 3aMZI, whereas two RF drivers are needed for the 2×2aMZI.

Figure 6:
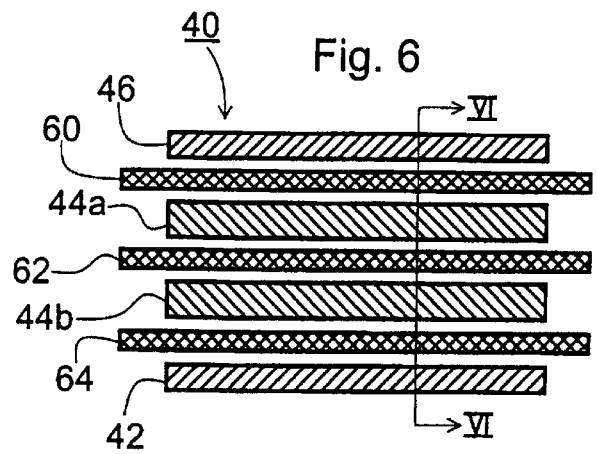
FIG. 6 shows a first alternative electrode configuration.
Figure 7:
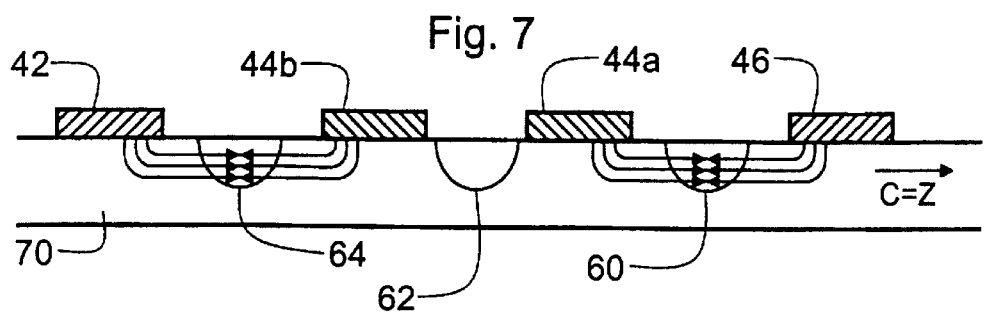
FIG. 7 is a section through line VI—VI of FIG. 6.

FIGS. 6 and 7 shown an alternative AC electrode configuration according to a second embodiment of the invention. In this alternative configuration, the AC electrode structure 40 adjacent to the central waveguide 62 is split into two central electrodes 44A and 44B, as illustrated in FIG. 6. Further AC electrodes 42 and 46 are arranged adjacent to the external waveguides 60 and 64, as in the first embodiment.

FIG. 7 shows a Section VI through the AC electrode structure of FIG. 6 showing the substrate 70 which is an x-cut lithium niobate substrate, as in the first embodiment. As can be seen, the split central RF electrode allows the central waveguide 62 to be substantially free of electric fields induced by the RF drive signal for any of a range of different spacings central and peripheral waveguides. In addition, the provision of two centrally placed electrodes allows the choice between using a single RF drive circuit driving both electrode 44A and 44B, or the use of two separate RF drive circuits to separately drive the two electrodes 44A and 44B. Although two separate RF drivers require synchronization, the use of two RF drivers allows them to have reduced peak power in comparison to a single RF driver. By synchronization, it is meant that the respective RF drive signals must be in phase and have the same voltage amplitude. It will also be understood that the ground and signal RF electrodes may be swapped. In other words, RF electrodes 44A and 44B may be ground electrodes and RF electrodes 42 and 46 may be signal electrodes. Other aspects of the second embodiment will be understood from the above description of the above description of the first embodiment.

Figure 8:
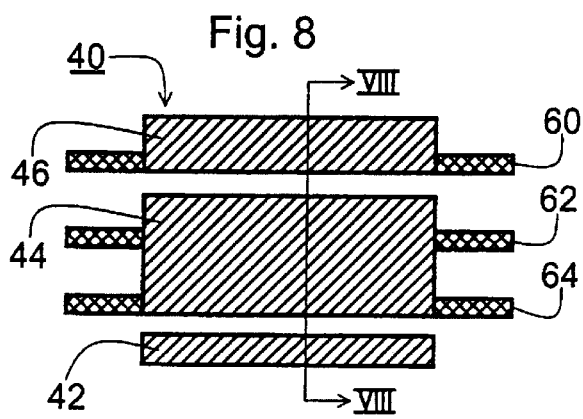
FIG. 8 shows a second alternative electrode configuration.
Figure 9:
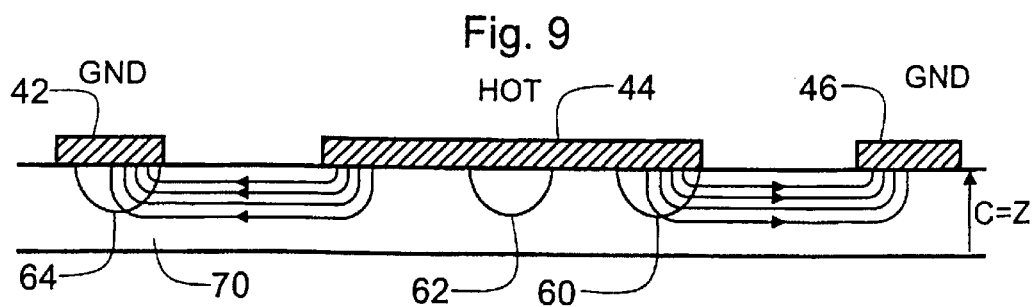
FIG. 9 is a section through line VIII—VIII of FIG. 8.

FIGS. 8 and 9 show a further variation of the AC electrode configuration according to a third embodiment of the invention. In the third embodiment, instead of using an x-cut lithium niobate substrate, the substrate is a z-cut of lithium niobate. In other words, the z-axis of the lithium niobate crystal is arranged perpendicular to the plane of the substrate 70. As will be understood by those skilled in the art, the use of a z-cut substrate affects the electrode placement. As illustrated in FIGS. 8 and 9, the central "hot" AC electrode 44 is arranged over both the central waveguide 62 and one of the peripheral waveguides 64. The peripheral ground electrode 42 is arranged to one side of the peripheral waveguide 64 (in plan view). The other peripheral ground electrode 44 is arranged over the peripheral waveguide 60. As shown by the field lines in FIG. 9, this arrangement maximizes the electric field along the z-axis of the substrate 70 in the region of the peripheral waveguides 60 and 64, and ensures that there is substantially no electric field in the region of the central waveguide 62. FIG. 9 is a Section VIII through FIG. 8.

For each of the above embodiments, typical dimensions for the electrodes are as follows: thickness 5 microns, gap between each electrode 15 microns; width 20 microns (or 50 microns for a central unsplit electrode). These numbers are merely exemplary, the precise dimensions being dependent on the desired frequency response, technology and operating wavelength. The dimensions will vary at least by a factor of 2 depending upon the application. Further, the electrodes may be made of gold or other suitable material such as Ti.

Moreover, although the above embodiments use lithium niobate for the substrate, a variety of other materials could be used. Further examples of suitable materials are lithium tantalate, sodium barium niobate, strontium barium niobate, potassium titanyl niobate (KTN), potassium titanyl phosphate (KTP), rubidium titanyl arsenate (RTA), isomorphs of KTP, RTA, barium titanate, potassium titanate, GaAs, InP, quartz, silica, SiON, $Si_3N_4$ and polymer. Alloys based on these compounds may also be used. In addition, any of the preceding materials may include dopants such as titanium, zinc, erbium, neodymium, ytterbium, holmium, barium, cerium, rubidium, magnesium, magnesium oxide or iron.

Having now described some alternative electrode configurations with reference to FIGS. 6 to 9, operation of the device of the first embodiment is now described in more detail.

FIG. 10 shows the intensity transfer function of the device of the first embodiment. Output intensity $I_0$ is plotted against voltage V normalized to $V_\pi$, the voltage at which the phase shift on each arm is $|\Delta\phi|=\pi/2$. The voltage $V_\pi$ may thus be thought of as the switching voltage of the device.

The intensity transfer function plotted in the figure is for a device having a power splitting ratio of 25:50:25 between the first, second and third interferometer arms 60, 62 and 64 respectively. These are the same example values as already mentioned with reference to FIGS. 3 to 5. The 3aMZI in this example is structured such that there is extinction of the output signal when the RF voltage is not applied (i.e. when it is zero). This zero point is illustrated by Point B on the intensity transfer function of FIG. 10. As the RF voltage is increased in the positive direction the output intensity increases until a first maximum is reached at Point A in the figure. The difference between the minimum at Point B and the maximum at Point A represents a phase change of $\Delta\phi=\pi/2$. An intermediate position in the intensity transfer function is also marked as Point C. Point C is at a phase change of $\pi/4$ which is midway between Points A and B.

Operation of the example device is now described in the three cases that the DC bias voltage is maintained to hold the device at Points A, B or C of FIG. 10, which represent working points of the device.

FIG. 11A is a graph plotting output intensity $I_{OUT}$ of the optical modulator of the first embodiment (solid line: left hand axis) as a function of time t normalized to inverse bit rate $T_{bit}$ of the modulated output signal and driven with a sinusoidal RF signal $V_{RF}$ (dashed line: right hand axis) of frequency $f_0$ and peak-to-peak amplitude $2V_\pi$.

In FIG. 11A, the device is held at Operating Point A of FIG. 10 which provides a RZ transmission mode. At Working Point A, the modulator is normally in the ON state so that, in the absence of an RF modulating signal, the input light signal passes through the modulator to form the output signal. To switch to the OFF state, a voltage $V_\pi$ is required. With the above-mentioned sinusoidal RF drive signal, the output signal comprises relatively short light pulses occurring at a repetition rate $1/T_{bit}=2f_0$, i.e. at twice the RF drive signal frequency $f_0$. The pulse width is 23% of the bit time, i.e. 0.23 $T_{bit}$, and the pulse shape is Gaussian. A reduction of the RF modulating voltage reduces the extinction ratio and increases the pulse width. For example, an RE modulating voltage of $0.9*2V_\pi$ produces pulses with an extinction ratio of −32 dB and a pulse width of 0.26 $T_{bit}$. If the RF modulating voltage is reduced further to $0.8*2V_\pi$, pulses with an extinction ratio of −20 dB and a width 0.30 $T_{bit}$ are produced. Working Point A is thus ideally suited to producing high bit rate short pulse generation with RZ modulation. The device can thus be termed a pulse generator when a continuous sinusoidal RF signal is applied to it. Such a device is useful for RZ transmission systems, such as soliton-based transmission systems.

FIG. 11B is a graph plotting output intensity $I_{OUT}$ of the optical modulator of the first embodiment (solid lines: left hand axis) as a function of time t normalized to inverse bit rate $T_{bit}$ when the device is held at Operating Point B of FIG. 10 and driven with a sinusoidal RF signal $V_{RF}$ (dashed line: right hand axis) of peak-to-peak amplitude of $2V_\pi$ (upper solid curve) and also $V_\pi$ (lower solid curve).

At Working Point B, the modulator is normally at the OFF state, so that, in the absence of an RF modulating signal the input light signal is extinguished and thus does not arrive at the output of the device owing to destructive interference in the 3aMZI. To switch to the ON state, a voltage $V_\pi$ is required.

In the figure, examples of two different RF drive voltages are given.

First, referring to the upper solid curve, if the modulator is driven by a sinusoidal RF signal of peak-to-peak amplitude equal to $2V_\pi$ and frequency $f_0$, light pulses at a repetition rate of $1/T_{bit}=2f_0$ are produced. The pulse width is 55% of the bit time, i.e. 0.55 $T_{bit}$, and the pulse shape is super-Gaussian with m=2.

Second, referring to the lower solid curve, if the modulating voltage is reduced by a factor of two to $0.5*2V_\pi$, then, as illustrated, the pulse shape becomes simple Gaussian with m=1. This Gaussian shape is retained for voltages lower than $0.5*2V_\pi$. The pulse width is also reduced at these lower RF peak-to-peak voltages. In theory, the RF voltage can be reduced to zero and modulation will still occur. This is because the extinction ratio is theoretically infinite. In practice, it is thus expected that a wide range of RF drive voltages would be useable at Working Point B, including very low values. It is also noted that the peaks output pulse intensity at a modulation voltage of $0.5*2V_\pi$ is reduced to 25% of its $2V_\pi$ value and the pulse width is reduced to $0.40T_{bit}$. At an intermediate modulating voltage of $0.8*2V_\pi$, the peak output pulse intensity is 63% of the $2V_\pi$ value and the pulse width is $0.48T_{bit}$.

Working Point B is thus ideal for RZ data modulation requiring high bit rate short pulse generation with controlled amplitude, pulse width and pulse shape, as well as very low extinction ratio. The device may thus be used as a pulse generator, for example for soliton transmission.

FIG. 11C is a graph plotting output intensity $I_{OUT}$ of the optical modulator of the first embodiment (solid line 3aMZI: left hand axis) as a function of time t normalized to inverse bit rate $T_{bit}$ when the device is held at Operating Point C of FIG. 10 and driven with a sinusoidal RF signal $V_{RF}$ (dashed line: right hand axis) of peak-to-peak amplitude of half the drive voltage, i.e. $V_\pi/2$, in a NRZ transmission mode: for reference the response of a 2aMZI is also shown (solid line: left hand axis);

At Working Point C, the modulator functions as an NRZ modulator. If, as Illustrated the modulator is driven by a sinusoidal RF signal of peak-to-peak amplitude equal to $V_\pi/2$ at a frequency $f_0$, then light pulses with a repetition rate $f_0$ are produced. In this case, the modulating voltage is four times lower than the $2V_\pi$ examples of the RZ modulator at Working Points A and B. As well as the reduction in the modulating voltage, the bit rate is halved, As can be seen by comparing the two solid curves in FIG. 11C, in comparison to a classical balanced 2aMZI, the extinction ratio at Working Point C for the 3aMZI is very low. For example, if the RF modulation voltage is reduced to $0.9*V_\pi/2$, then the extinction ratio is −44 dB. The comparable value of the extinction ratio of a classical balanced 2aMZI would only be −16 dB.

From the above description of FIGS. 10, 11A, 11B and 11C, it will be understood that the modulator of the first embodiment can be switched between different operational modes by changing the working point and also by changing the RF drive voltage. The feedback controller 82 illustrated in FIG. 5 can adopt the function of mode switch. In other words, the feedback controller 82 can be configured to drive the DC supply 80 to maintain any desired bias voltage, for example a DC bias voltage suitable for maintaining Wording Points A, B, or C in the above examples. If the peak-to-peak values of the RF modulation signal were also to be used as a parameter for varying operation of the device, then the RP drive circuitry 76 would also require a mode switching capability. This could be implemented by a further input received by the RF drive circuitry 76 from the feedback controller 82, for example.

A particular feature of the device is its tolerance to variations in fabrication and operating conditions. In the case of the above described example with a power splitting ratio of 25:50:25 between the first second and third arms 60, 62 and 64, an extinction ratio >30 dB is maintained, provided that the power coupled into the central waveguide 62 can be kept within a ±3.5% variation range. For a lower extinction ratio of >25 dB, the power coupled into the central waveguide need only be kept within a ±6% range. The device is also relatively tolerant to power imbalance between the two external waveguides 60 and 64. For example, the power splitting balance between the first and third arms 60 and 64 needs only to be stable within ±5% to achieve an extinction ratio >30 dB, or ±8% to achieve an extinction ratio >25 dB. In all these examples, it is assumed that the input and output couplers are identical. Clearly, the precise values for the tolerances will be specific to the splitting ratios. However, it is generally the case that the tolerance of the 3aMZI modulator to deviations from the design power splitting ratios is far superior to that of a conventional 2aMZI. Although there is no precise range of power balance required, since this is application specific, for most applications the power in the first and third interferometer arms will not differ by more than 10%.

Another interesting property showing the operational tolerance of the device, is the very large tolerance of the device to imbalances of the applied RF modulation voltage applied to the AC electrodes at Working Point B. At Working Point B, an imbalance of the RF modulation voltage only produces a small attenuation of the output light signal. For example, a very large imbalance of 33% only produces a loss of 1 dB for the electrode configuration of FIG. 3.

It will be understood that the device performance has been described with reference to Working Points A, B and C by way of example. Other working points are possible. In particular, working points intermediate between points A and B are possible. In addition, owing to the cyclical nature of the intensity transfer function equivalent working points will be found periodically as the DC bias voltage is increased or decreased. Working Points A and B are the preferred operating points for RZ data modulation, whereas Working Point C is preferred for NRZ data modulation.

FIG. 12 is a block schematic diagram of an optical transmission system 300 incorporating a plurality of optical modulator units 301 embodying the invention. The optical transmission system is a wavelength division multiplexed (WDM) transmission system. Each modulator unit 301 may be as shown in FIG. 5 and comprises a modulator embodying the invention. The modulator units 301 are each operable at a different wavelength. The modulator units 301 serve as transmitters, the outputs of which are supplied to a wavelength combiner or multiplexer 303 which launches the combined WDM signal onto an optical transmission path 305. The optical transmission path comprises a number of repeater stations 306 incorporating optical amplifiers. The transmission path 305 leads to a demultiplexer 304 which forms an input stage for a receiver unit. The demultiplexer routes the different wavelength components to corresponding receiver components 302. The wavelength range of the WDM signals may be between 1520 and 1650 nm, for example.

The effect on the device characteristics of varying the power splitting ratio in the 3aMZI is now discussed in more detail. The mathematical details are not described here, but may be derived, for example from reference [7].

FIG. 13 is a graph showing the intensity transfer function $I_0$ of a 3aMZI for four different values of the power splitting ratio. Intensity $I_0$ is plotted against DC bias voltage V normalized to the voltage $V_\pi$, which is the voltage needed to reach the first zero in the transfer function in a classical 2aMZI. In each of the examples shown in the figure, the 3aMZI is balanced, i.e. equal powers are coupled into each of the external waveguide arms. The percentage value indicated on the graph alongside each curve is the percentage power coupled into the central waveguide. Accordingly, the dashed curve indicating zero power coupled into the central waveguide gives the limit in which the 3aMZI effectively becomes a 2aMZI. The three solid curves indicate 20%, 33% and 50% coupling power into the central waveguide, in other words power splitting ratios between the first second and third arms of 40:20:40, 33:33;33 and 25:50:25 respectively. The 50% curve is thus the intensity transfer function specified in Equation (1) and previously illustrated in FIG. 10. The 20% and 33% curves represent new examples not previously described.

In the 0% example (dashed line), where the power is split entirely into the two external waveguides only, the first zero is $V_\pi$. In other words, the 2aMZI limit is reached as expected. In the 20% example, the transfer function has its first zero at a somewhat higher voltage $V=1.16V_\pi$. In the 33% example, where the input light power is distributed equally between the three arms, the transfer function has its first zero at $V=4/3V_\pi$. A broadening of the notch is also visible. In the 50% example, the transfer function has its first zero at $V=2V_\pi$ but the notch can be seen to have become very wide.

FIG. 14 is a graph indicating this increase of voltage of the first zero of the 3aMZI transfer function as a function of the power splitting ratio. Voltage V, normalized to the 2aMZI zero position $V_\pi$, is plotted against percentage power P coupled into the central waveguide. The graph plots P only up to 50%, because, if more than 50% of the power is coupled into the central waveguide, no zeros are present in the transfer function. As can be seen from the graph, in the limit that no power is coupled into the central waveguide, the notch position is identical to that of a 2aMZI as expected. In the other limit that 50% of the power is coupled into the central waveguide, the notch is positioned at twice the voltage (or phase) of that of a 2aMZI. The notch position moves supra-linearly as power is increased, as can be seen clearly from the graph.

FIG. 15 shows the evolution of the notch width W, normalized to the notch width of a 2aMZI, as the power coupled into the central waveguide is increased. The notch width is measured at a level of −30 dB. Again, in the limit of zero power coupled into the central waveguide, the notch is identical to that of a 2aMZI as expected. The notch width rises relatively slowly as the power in the central waveguide increases from 0% to around 30%. Thereafter, the notch width increases quite rapidly rising to a maximum of 11.8 times the notch width of a 2aMZI when 50% of the power is coupled into the central waveguide. The notch width is already twice that of a 2aMZI when approximately 38% of the power is coupled into the central waveguide. If a zero in the transfer function is important for the particular application, the percentage power coupled into the second interferometer arm is thus preferably in the range 30 to 50% of the total power coupled into the arms, more preferably 40 to 50%, or 45 to 50%.

The notch width can therefore be tailored by an appropriate choice of power splitting ratio. The power splitting ratio is selected through the design of the input signal splitter, e.g. coupler or splitter. As is well known in the art, couplers and splitters can be fabricated with a wide arrange of splitting ratios. The ability to control the notch width through the power splitting ratio is an important feature of the present device, because wide notches are highly desirable for digital applications. With the aid of calibration curves such as those presented in FIGS. 14 and 15, a designer can select an optimum power splitting ratio that gives a good trade off between notch width and switching voltage, it being noted that the broadened notch widths require higher switching voltages.

For the sake of completeness, some alternative constructions for the input divider and output combiner are illustrated in FIGS. 16A to C. FIG. 16A shows a three-furcation, that is a three-way splitter which can be used instead of one or both of the three-way couplers illustrated in FIG. 3. FIG. 16B illustrates two cascaded Y-splitters which can also perform the same function of splitting an input signal into the three arms of the interferometer, or combining the signal from the three interferometer arms. FIG. 16C shows an analogous cascade, this time implemented with two 2-way couplers.

FIG. 17 shows an optical modulator according to a further embodiment in which the signal divider 12 and signal combiner 14 are fabricated with cascaded Y-splitters as shown in FIG. 16B. In a specific example, the splitters are 50/50 power splitters so that 50% of the input power is coupled into the arm 62 and 25% each into the arms 60 and 64. Equal and opposite phase shifts of magnitude $\Delta\phi$ are induced in the optical signals traversing arms 60 and 64 by an applied modulation signal applied to the AC electrodes 42, 44, 46, wherein electrode 44 is the signal electrode and electrodes 42 and 46 ground electrodes. The modulation signal does not affect the signal component travelling along waveguide arm 62. The DC electrodes are not shown for ease of representation.

In summary, the above embodiments illustrate the following features and advantages that can be achieved with embodiments of the invention, namely:

1. The device is suitable for the generation and/or modulation of RZ intensity pulses in an electro-optic device for optical communications.
2. The device can be fabricated so that only one modulation source is required, i.e. only one RF driver.
3. The device can provide RZ pulses with adjustable pulse width and pulse shape.
4. The device can be operated as an NRZ modulator which has an improved extinction ratio in comparison to conventional 2aMZI modulators.
5. The device in RZ modulation form can also provide a very low extinction ratio.
6. The device can be designed to be operable at very high data rates which are demanded for high speed communication systems.
7. A device can also be made which provides for adjustment of the modulator's output intensity, while keeping the extinction ratio vary low and without requiring an attenuator (see discussion of FIG. 11B).

REFERENCES

[1] P Hallemeier et al., "Next generation 10 Gb/s Lithium Niobate Components for RZ Based Transmission Techniques", NFOEF Technical Proc., September 1999, pages 175–180, and references therein cited

[2] E L Wooten et al IEEE 'A Review of Lithium Niobate Modulators for Fiber-Optic Communications Systems' Journal of Selected Topics in Quantum Electronics, vol. 6, no. 1, January/February 2000

[3] J J Veselka et al 'Pulse Generation for Soliton systems using lithium niobate modulators' IEEE Journal of Selected Topics in Quantum Electronics, vol. 2, no. 2, June 1996

[4] G Weihs et al, "All fiber three-path Mach-Zehnder interferometer", Optics Letters, Vol. 21, No. 4, Feb. 15, 1996, pages 302–304

[5] WO 98/53367 (PCT/US98/10570)—Kestrel Solutions, Inc.
[6] U.S. Pat. No. 5,109,441—Glaab
[7] H A Haus and C G Fonstad Jr "Three-waveguide Couplers for Improved Sampling and Filtering", IEEE Journal of Quantum Electronics, Vol. QE-17, No. 12, December 1981, pages 2321–2325

What is claimed is:

1. A device for modulating an optical signal, comprising:

an interferometer comprising: an optical signal divider; a plurality of arms; and an optical signal combiner arranged respectively to divide, convey and interferometrically recombine components of the optical signal into, along and from the arms;

a DC electrode structure for biasing the interferometer at a working point of the device;

an AC electrode structure for applying an electrical modulation signal to the interferometer;

wherein the plurality of arms includes first, second and third arms, wherein the optical signal divider is structured so that the components of the optical signal coupled into the first and third arms are of approximately equal power, and wherein the AC electrode structure is configured so that the electrical modulation signal induces phase shifts of opposite sign and approximately equal magnitude in the first and third arms.

2. A device according to claim 1, wherein the second arm is arranged as a central waveguide between the first and third arms which are arranged as two external waveguides extending either side of the central waveguide.

3. A device according to claim 1, wherein the optical signal divider is structured to couple between 30 and 50%, more preferably 40 and 50%, still more preferably 45 and 50%, of the optical signal, by power, into the second arm.

4. A device according to claim 1, wherein the optical signal divider is structured to couple between 40 and 60%, more preferably 42 and 58%, still more preferably 45 and 55%, yet more preferably 46.5 and 53.5% of the optical signal, by power, into the second arm.

5. A device according to claim 1, wherein the optical signal divider is a splitter.

6. A device according to claim 1, wherein the optical signal divider is a coupler.

7. A device according to claim 1, wherein the optical signal combiner is a splitter.

8. A device according to claim 1, wherein the optical signal combiner is a coupler.

9. A device according to claim 1, further comprising a bias power supply operable to bias the DC electrode structure at a desired working point of the device.

10. A device according to claim 9, further comprising a bias controller having an output connected to the bias power supply and an input connected to the optical signal combiner, the bias controller being operable to control the biasing of the DC electrode structure, and thus the working point of the device, responsive to a feedback signal received at its input from the optical signal combiner.

11. A device according to claim 1, wherein the interferometer has a Mach-Zehnder configuration.

12. A device according to claim 1, wherein the AC electrode structure comprises travelling wave electrodes.

13. A method of modulating an optical signal comprising:

(a) providing an interferometer having first, second and third arms;

(b) biasing the interferometer at a working point thereof;

(c) supplying an optical signal to the interferometer;

(d) dividing the optical signal into components in each of the first, second and third arms, wherein the components of the optical signal coupled into the first and third arms are of approximately equal power; and (e) applying a modulation signal to the interferometer so as to induce phase shifts of opposite sign and approximately equal magnitude in the first and third arms.

14. A method according to claim 13, wherein the interferometer has a power transfer function and wherein the working point is approximately at a maximum in the power transfer function of the interferometer, to provide return-zero (RZ) modulation of the optical signal.

15. A method according to claim 13, wherein the interferometer has a power transfer function and wherein the working point is approximately at a minimum in the power transfer function of the interferometer, to provide return-zero (RZ) modulation of the optical signal.

16. A method according to claim 13, wherein the interferometer has a power transfer function and wherein the working point is intermediately positioned between a minimum and a maximum of the power transfer function of the interferometer, to provide non-return-zero (NRZ) modulation of the optical signal.

17. A method according to claim 13, wherein between 30 and 50% of the power of the optical signal is coupled into the second arm.

18. A method according to claim 13, wherein between 40 and 50% of the power of the optical signal is coupled into the second arm.

19. A method according to claim 13, wherein the second arm is arranged as a central waveguide between the first and third arms which are arranged as two external waveguides extending either side of the central waveguide.

20. A method according to claim 13, wherein the modulation signal is a continuous sinusoidal signal to generate a pulse train in the optical signal.

* * * * *